Feb. 16, 1954   N. F. HAWTHORNE   2,669,387
LOAD INDICATING ACCUMULATOR FOR GAUGES
Filed Dec. 13, 1952   2 Sheets-Sheet 1

INVENTOR
Nathaniel F. Hawthorne
BY
Webster & Webster
ATTY'S.

Feb. 16, 1954   N. F. HAWTHORNE   2,669,387
LOAD INDICATING ACCUMULATOR FOR GAUGES
Filed Dec. 13, 1952   2 Sheets-Sheet 2
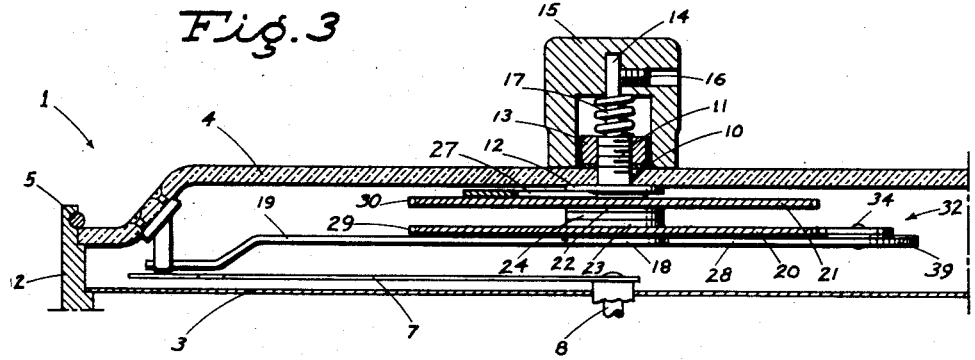
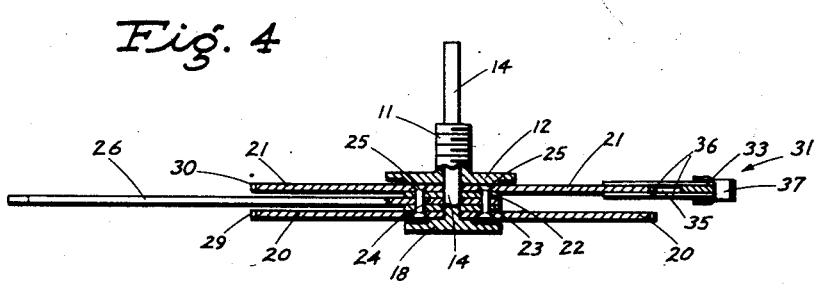
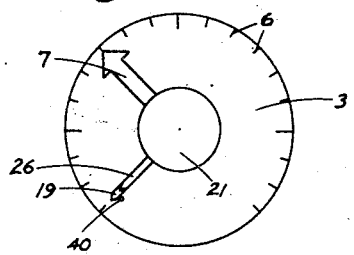 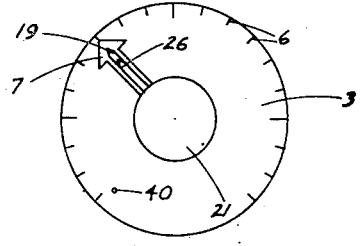
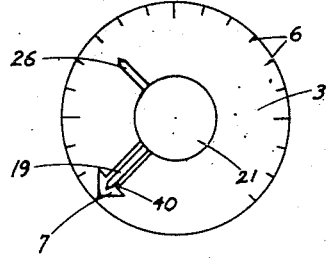 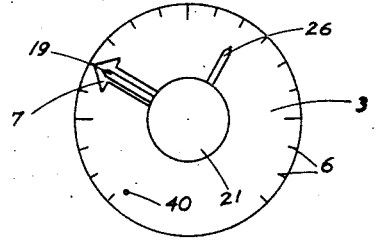
INVENTOR
*Nathaniel F. Hawthorne*
BY
*Webster & Webster*
ATTY'S.

Patented Feb. 16, 1954

2,669,387

UNITED STATES PATENT OFFICE 2,669,387

LOAD INDICATING ACCUMULATOR FOR GAUGES

Nathaniel F. Hawthorne, Alameda, Calif.

Application December 13, 1952, Serial No. 325,863

4 Claims. (Cl. 235—83)

This invention relates to, and it is a major object to provide, a novel device adapted for use on a gauge to accumulate successive separate readings of the gauge, whereby to visually reflect the total.

The invention is especially designed, but not limited, for use on a hydraulic gauge calibrated in weight; such a gauge being useful—for example—in connection with the hydraulic system of the load supporting ram of a fork lift truck, whereby to visually indicate to the operator the weight of each load handled by such truck.

The present device provides, on the gauge, a readily visible indication of the accumulative or total weight of the successive loads handled by the truck.

Another important object of the present invention is to provide an indicating accumulator, for the purpose described, which is manually actuated to effect a setting of one pointer to correspond to each separate reading on the gauge, but automatic in response to said separate settings to progressively advance another pointer to proper position to reflect the total of said separate readings.

An additional object of the invention is to provide an indicating accumulator, as in the preceding paragraph, wherein the two pointers of the device are mounted in connection with, and actuated by, a pawl and ratchet assembly of novel construction and function.

A further object of the invention is to provide an indicating accumulator which is mounted in its entirety on the face of a gauge, whereby the latter may be of conventional construction, saving and excepting the provision of a substitute face.

It is also an object of the invention to provide an indicating accumulator which is adapted for ease and economy of manufacture, together with convenience of installation and use.

Still another object of the invention is to provide a practical and reliable indicating accumulator, and one which will be exceedingly effective for the purpose for which it is designed.

These objects are accomplished by means of such structure and relative arrangement of parts as will fully appear by a perusal of the following specification and claims.

In the drawings:

Fig. 3 is an enlarged fragmentary cross section on line 3—3 of Fig. 1.

Fig. 4 is an enlarged cross section on line 4—4 of Fig. 2.

Figs. 5-8 are diagrammatic front elevations illustrating the successive steps in the use of the device.

Figure 1:
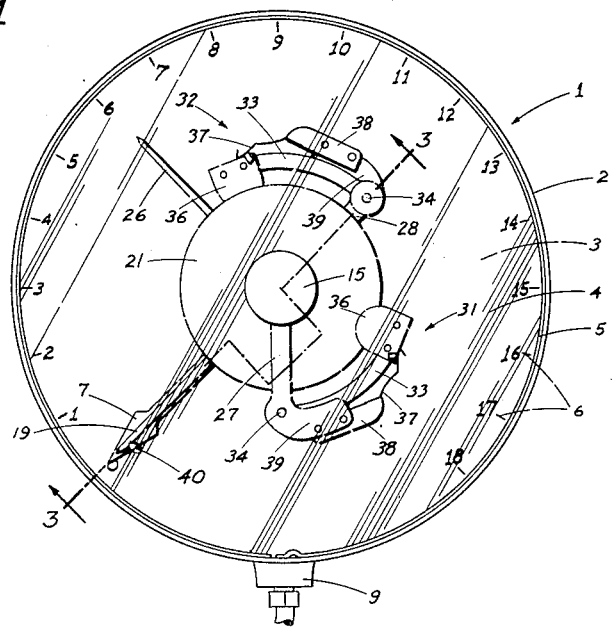
Fig. 1 is a front elevation of a gauge fitted with the present invention.
Figure 2:
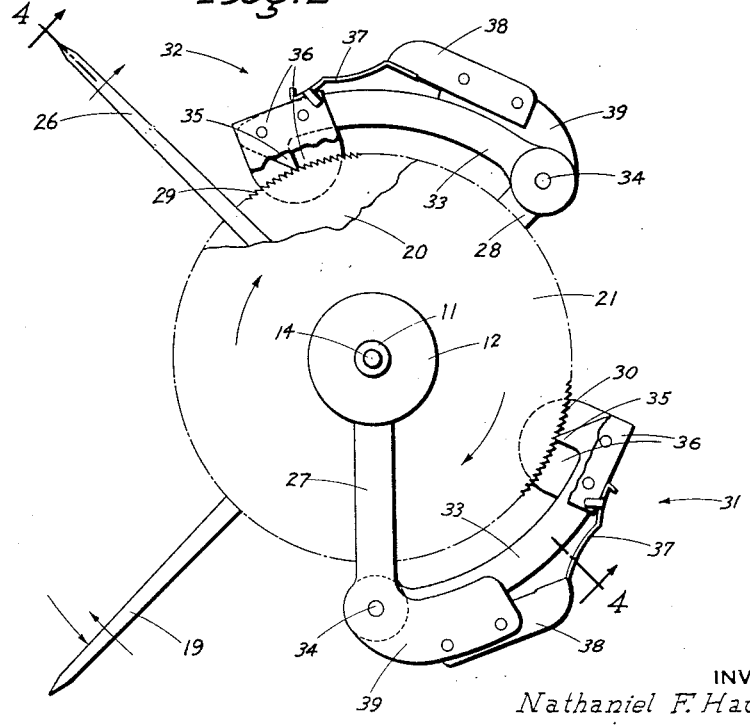
Fig. 2 is an enlarged front elevation of the indicating accumulator, detached from the gauge and with the knob removed.

Referring now more particularly to the characters of reference on the drawings, the present invention is adapted for use in connection with a hydraulic gauge, indicated generally at 1; such gauge including a circular case or body 2 having a gauge dial 3 rearwardly of the transparent face 4 of such gauge. The gauge face 4 is removably held in place on the case 2 by suitable means, such as a retention ring 5.

The gauge dial 3 is calibrated in terms of weight, the calibrations—about the periphery of said dial—being indicated at 6.

The gauge includes a needle or pointer 7 which reads on the calibrated dial 3, and such pointer 7 is carried by a spindle 8 operated by the conventional mechanism of the gauge. The gauge is adapted to be coupled into a fluid pressure conduit system, as on a fork truck, by means of a fitting 9.

The above structure of the gauge is substantially conventional, except that here the transparent face 4 forms a mount to permit of the mounting in connection with said dial of the indicating accumulator, which embodies the present invention, and which is constructed as follows:

The face 4 is formed with a central opening 10 through which a short tubular neck 11 turnably projects, said neck being formed, on its inner end, with an enlarged hub 12 which abuts the face 4 on its inner side, the neck, on its outer end, being threaded and having a nut 13 thereon which locks said neck in place on the face.

A spindle 14 extends through the neck 11, and a knob 15 is attached to the outer end of said spindle 14 by a set screw 16; the knob 15 having a cavity whereby to surround the nut 13, and a compression spring 17 surrounds said spindle between the nut and adjacent portion of the knob. The purpose of the spring 17 is to maintain, in proper engagement, certain parts which are carried on the spindle inwardly of the face 4, as will hereinafter appear.

At its inner end, and in spaced relation to the face 4, the spindle 14 is fixed to an enlarged hub 18, which hub is an intermediate and integral part of a radial pointer 19 whose effective length, in the forward portion thereof, is substantially the same as that of the gauge pointer 7, so that both read relatively close to the calibrations 6.

Above the enlarged hub 18 the device includes an inner ratchet disc 20 and an outer ratchet disc 21 of like diameter but having substantially lesser radius than the pointer 19; the ratchet discs 20 and 21 surrounding the spindle 14 in rotatable relation, and being spaced apart by a pair of spacing washers 22 and 23, together with a flat hub 24 which lies between said spacing washers.

The inner ratchet disc 20 and outer ratchet disc 21, with the spacing washers 22 and 23, and the flat hub 24, are all secured together for rotation as a unit, hereinafter styled the "disc unit." The parts of the disc unit are connected in unitary relation by a plurality of rivets 25 extending therethrough.

The flat hub 24 is the integral inner end portion of another pointer 26 which extends radially out from between the ratchet discs 20 and 21 and terminates at its outer end a greater distance from the calibrations 6 than the pointers 7 and 19.

The purpose of the spring 17 will now be evident; such spring acting to urge the spindle 14 axially out whereby to maintain the described disc unit in proper engagement between the hubs 12 and 18, yet without restricting rotation of such unit.

The hub 12 is formed as the integral inner end of a radial arm 27, which radial arm projects to a termination adjacent but outwardly of the periphery of the disc unit. Similarly, the rear end portion of the pointer 19 provides a radial arm 28 which likewise terminates at its rear end adjacent but outwardly of the periphery of the disc unit.

Each of the discs 20 and 21 is formed at the periphery with ratchet teeth; the ratchet teeth for the disc 20 being indicated at 29, while the ratchet teeth for the disc 21 are indicated at 30. The ratchet teeth 30 all face in a direction contra to the intended direction of rotation of the disc unit as indicated by the arrows.

Pawl units, indicated generally at 31 and 32, extend from the outer ends of the radial arms 27 and 28 contra to the direction of rotation of the disc unit; the pawl unit 31 cooperating with the ratchet teeth 30 of the disc 21, and the pawl unit 32 cooperating with the ratchet teeth 29 of the disc 20. It will be recognized that as the pawl unit 31 is carried on the fixed radial arm 27, such unit will permit of rotation of the disc unit in the direction indicated by the arrows, but will prevent its rotation in the opposite direction.

As the pawl unit 32 is carried on the rear end of the rotatable pointer 19, such pawl unit 13 may progress about the disc unit in a direction opposite the intended direction of rotation of such unit, or may be moved in the opposite direction carrying the disc unit with it, in which event the pawl unit 31 merely overruns as said disc unit is so advanced.

As the pawl units 31 and 32 are of identical construction, a description of one will suffice for both.

Each such pawl unit comprises an arcuate arm 33 pivoted at its forward end, as at 34, to the adjacent outer end of the arm 27 or 28, as the case may be.

From the pivot 34 the arcuate arm 33 extends rearwardly in generally concentric relation to the disc unit, and at its rear end such arm 33 is formed with a pawl 35 which engages the corresponding ratchet teeth; the pawl 35 of the pawl unit 31 engaging the ratchet teeth 30, while the pawl 35 of the pawl unit 32 engages the ratchet teeth 29.

In order to maintain each pawl 35 against lateral escape from the related ratchet teeth, each arm 33 is fitted, on its outer end, with a saddle 36 which straddles the peripheral portion of the disc.

Each pawl 35 is yieldably urged radially inwardly, so as to maintain engagement with the corresponding ratchet teeth, by means of a leaf spring 37 which bears against the outside of the arm 33; such spring being supported by an attachment flange 38 fixed to a rigid extension 39 of the related arm 27 or 28.

With the above described pawl and ratchet assembly, in combination with the disc unit and pointers mounted as described thereby, it will be recognized that when the knob 15 is manually turned in a counter-clockwise direction the pointer 19 will move in a corresponding direction; the pawl unit 32 overrunning, and the disc unit remaining stationary under the influence of the pawl unit 31. Thus, counter-clockwise motion of the knob returns the pointer 19 to a zero position against a stop 40 which depends from the face 4 in position for engagement solely by said pointer; the pointers 7 and 26 clearing such stop.

Upon clockwise rotation of the knob 15 and pointer 19, the pawl unit 32 picks up the disc unit and rotates it, along with the pointer 26, in such clockwise direction; the pawl unit 31 then overrunning.

The above described device is used, as a load indicating accumulator, in the following manner:

At the start the operator rotates the knob 15 clockwise until the pointer 26 reaches the zero position, and then such knob is reversed and run counter-clockwise until the pointer 19 is also brought to said zero position, then being against the stop 40. At the start the gauge pointer 7 is likewise at zero position.

Upon the gauge 1 being subjected to a load, the gauge pointer 7 swings to a corresponding reading on the gauge dial 3, as in Fig. 5; the pointers 19 and 26 remaining at zero.

With the gauge under such load and so reading, the operator turns the knob 15 in a clockwise direction, which rotates the disc unit and the pointers 19 and 26 in unison until both of said pointers are set to the same reading as the gauge pointer 7; this being shown in Fig. 6.

As soon as the load is relieved from the gauge 1, the gauge pointer 7 returns to zero position, and the operator then rotates the knob 15 in a counter-clockwise direction to return the pointer 19 to said zero position; the pointer 26 remaining at the previous setting for the reason that the disc unit remains stationary—due to the described ratchet and pawl assembly—upon such counter-clockwise rotation of the knob 15 and pointer 19. See Fig. 7.

When the next load is imposed on the gauge 1, which results in the gauge pointer 7 again swinging to a reading on the gauge dial 3, the operator—while the gauge remains under such load—rotates the knob 15 clockwise to an extent sufficient to register the pointer 19 with said gauge pointer 7. As the disc unit rotates with the knob in such clockwise direction, the pointer 26 is automatically advanced from its position of first setting to a position of second setting, as in Fig. 8, an amount equal to that which the pointer 19 was turned to correspond to the second reading of the gauge pointer 7.

It will thus be recognized that with each return of the pointer 19 to zero position, followed by a resetting of such pointer 19 to the following reading of the gauge pointer 7, the pointer 26 will be progressively and correspondingly advanced, thus giving a cumulative or total reading on the gauge dial 3.

Consequently, after the gauge 1 has been subjected to a number of load readings, with corresponding settings of the pointer 19, each followed by return of such pointer 19 to zero position, the pointer 26 is progressively moved ahead to provide the desired cumulative reading.

When the gauge is used in connection with a forklift truck, as previously described, the operator—after a number of loads has been handled—can readily visually ascertain from the gauge the total weight of such loads; this being very desirable for record purposes or the like.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An indicating accumulator comprising, with a calibrated dial having a zero position, a pair of rotary pointers mounted to read on the dial, accessible hand operated means connected to one pointer to reversibly rotate the same for advance from or return to said zero position, a ratchet disc unit concentric to the axis of the pointers, said disc unit including axially spaced discs each having a row of circumferentially extending ratchet teeth, said one pointer being reversibly rotatable relative to such unit and the other pointer being fixed thereon, a pawl connected between said one pointer and one row of said ratchet teeth arranged to cause corresponding rotation of the unit upon advance of said one pointer, and another pawl cooperating with the other row of said ratchet teeth arranged to prevent rotation of said unit with, and in the direction of return of, said one pointer.

2. An indicating accumulator comprising, with a calibrated dial having a zero position, a mount fixed relative to the dial, a spindle journaled on the mount for rotation axially of the dial, a hand knob on the outer end of the spindle, a pair of rotary pointers mounted to read on the dial, said pointers being radial of the spindle and one pointer being fixed thereto, a ratchet disc unit turnable about the spindle, the other pointer being fixed on said unit, the latter including axially spaced discs each having a circumferential row of ratchet teeth, a pawl connected between said one pointer and one row of said ratchet teeth arranged to cause corresponding rotation of the unit upon advance of said one pointer, and another pawl connected between the mount and said other row of ratchet teeth arranged to prevent rotation of said unit with and in the direction of return of said one pointer.

3. An indicating accumulator comprising, in combination with a calibrated dial and a mounting face spaced in front of the dial and arranged to allow visual inspection of the dial from in front of the accumulator, a short tubular neck extending through the face axially of the dial, an enlarged hub on the inner end of the neck abutting the inside of the face, a nut threaded on the neck abutting the outside of the face, a spindle extending in turnable relation through the neck, an enlarged hub on the inner end of the spindle in spaced relation to said first named hub, a ratchet disc unit turnable about the spindle between such hubs, a pair of rotary pointers disposed between the face and dial to read on the latter, one pointer extending in fixed relation radially from the hub on the spindle, the other pointer extending in fixed relation radially from the disc unit, the latter including separate circumferential rows of ratchet teeth, a pawl connected between said one pointer and one row of said ratchet teeth arranged to cause corresponding rotation of the unit upon advance of said one pointer from the zero position on the dial, another pawl connected between the hub on the neck and said other row of ratchet teeth arranged to prevent rotation of said unit and in the direction of return of said one pointer to said zero position, and a knob on the spindle exteriorly of the face.

4. An indicating accumulator, as in claim 3, including a compression spring surrounding the spindle between the outer end of the neck and adjacent end of the knob.

NATHANIEL F. HAWTHORNE.

References Cited in the file of this patent

UNITED STATES PATENTS

| Number | Name | Date |
| --- | --- | --- |
| 643,876 | Lane | Feb. 20, 1900 |
| 1,651,558 | Sheridan | Dec. 6, 1927 |

FOREIGN PATENTS

| Number | Country | Date |
| --- | --- | --- |
| 7,423 | Great Britain | 1897 |